(12) United States Patent
Le Bars et al.

(10) Patent No.: US 9,200,787 B2
(45) Date of Patent: Dec. 1, 2015

(54) LIGHTING AND/OR SIGNALING MODULE NOTABLY FOR A VEHICLE

(71) Applicants: Jean-Francois Le Bars, Elchingen (DE); Eric Moisy, Jaen (ES)

(72) Inventors: Jean-Francois Le Bars, Elchingen (DE); Eric Moisy, Jaen (ES)

(73) Assignee: Valeo Vision, Bobigny (FR)

(*) Notice: Subject to any disclaimer, the term of this patent is extended or adjusted under 35 U.S.C. 154(b) by 231 days.

(21) Appl. No.: 13/626,067

(22) Filed: Sep. 25, 2012

(65) Prior Publication Data

US 2013/0135888 A1 May 30, 2013

(30) Foreign Application Priority Data

Sep. 27, 2011 (FR) ..................... 11 58618

(51) Int. Cl.
 *B60Q 1/00* (2006.01)
 *F21V 19/04* (2006.01)
 *F21S 8/10* (2006.01)

(52) U.S. Cl.
 CPC ............. *F21V 19/04* (2013.01); *F21S 48/1104* (2013.01); *F21S 48/115* (2013.01); *F21S 48/1113* (2013.01); *F21S 48/1159* (2013.01); *F21S 48/1305* (2013.01); *F21S 48/1323* (2013.01); *F21S 48/212* (2013.01); *F21S 48/215* (2013.01); *F21S 48/328* (2013.01)

(58) Field of Classification Search
 CPC . F21S 48/1113; F21S 48/1122; F21S 48/212; F21S 48/328

USPC ......... 362/507, 538, 540, 548, 549, 652, 640, 362/649, 519

See application file for complete search history.

(56) References Cited

U.S. PATENT DOCUMENTS

| | | | | |
|---|---|---|---|---|
| 5,264,997 A * | 11/1993 | Hutchisson et al. | ........... | 362/645 |
| 7,104,654 B2 * | 9/2006 | Tamaru et al. | ................... | 353/85 |
| 7,374,322 B2 | 5/2008 | Steen et al. | | |
| 7,621,667 B2 | 11/2009 | Behr et al. | | |
| 7,762,700 B2 * | 7/2010 | Luo et al. | ....................... | 362/545 |

(Continued)

FOREIGN PATENT DOCUMENTS

| | | |
|---|---|---|
| EP | 1767399 | 3/2007 |
| EP | 1901001 | 3/2008 |
| EP | 2039992 | 3/2009 |

(Continued)

*Primary Examiner* — Peggy Neils
(74) *Attorney, Agent, or Firm* — Jacox, Meckstroth & Jenkins

(57) ABSTRACT

A lighting module comprising a light source of the LED type (not visible), a reflector with an elliptical reflective surface and a lens, the module being provided with means of quick-fastening to a mount. These means comprise a flange fitted with tabs (not visible) able to collaborate with corresponding notches of an orifice in the mount. This mounting allows the module to be fitted and removed very easily so that the light source or sources can be replaced, without disturbing the beam alignment. The invention also relates to the mount in question and to a corresponding headlamp.

19 Claims, 6 Drawing Sheets

(56) References Cited

U.S. PATENT DOCUMENTS

| | | |
|---|---|---|
| 7,806,562 B2 | 10/2010 | Behr et al. |
| 7,883,245 B2 * | 2/2011 | Melzner .................. 362/370 |
| 7,985,013 B2 | 7/2011 | Yasuda |
| 8,061,866 B2 | 11/2011 | Torre Sarmiento et al. |
| 8,186,862 B2 * | 5/2012 | Boroczki et al. ............ 362/538 |
| 8,360,625 B2 * | 1/2013 | Shibata et al. ............. 362/523 |
| 2005/0169002 A1 | 8/2005 | Steen et al. |
| 2008/0117647 A1 | 5/2008 | Behr et al. |
| 2008/0130308 A1 | 6/2008 | Behr et al. |
| 2009/0080211 A1 | 3/2009 | Yasuda |
| 2009/0303701 A1 | 12/2009 | Torre Sarmiento et al. |

FOREIGN PATENT DOCUMENTS

| | | |
|---|---|---|
| EP | 2194311 | 6/2010 |
| FR | 2727190 | 5/1996 |
| FR | 2917348 | 12/2008 |
| WO | 03066374 | 8/2003 |
| WO | 2006066530 | 6/2006 |
| WO | 2006066531 | 6/2006 |
| WO | WO2010146509 | * 12/2010 |

* cited by examiner

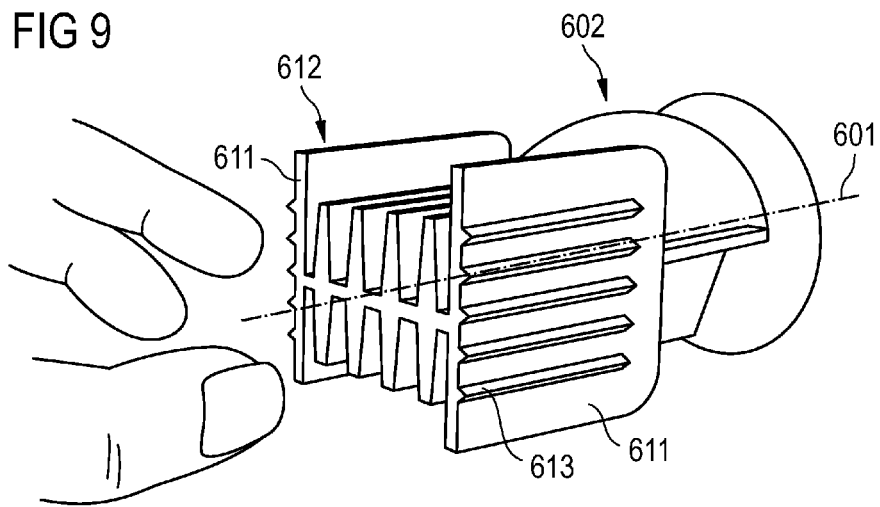
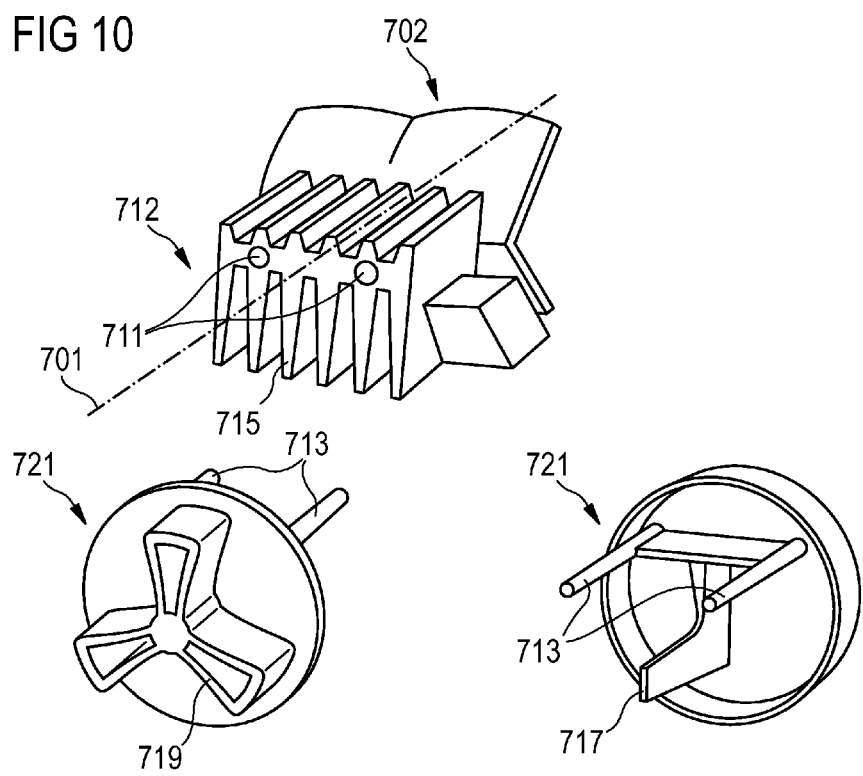

LIGHTING AND/OR SIGNALING MODULE NOTABLY FOR A VEHICLE

CROSS-REFERENCE TO RELATED APPLICATIONS

This application claims priority to French Application No. 1158618 filed Sep. 27, 2011, which application is incorporated herein by reference and made a part hereof.

BACKGROUND OF THE INVENTION

1. Field of the Invention

The invention relates to a lighting and/or signaling module, notably for a vehicle. The invention also relates to a mount for a lighting and/or signaling module and to a lighting and/or signaling device comprising the module and/or the mount.

2. Description of the Related Art

The use of light sources of the light-emitting diode (LED) type is becoming increasingly commonplace in motor vehicle headlamps and signaling lights. LEDs have an appreciably longer life than incandescent bulbs, specifically having a standard life in excess of 10,000 hours, sometimes of as much as 35,000 or even 50,000 hours, which is distinctly longer than the life of a motor vehicle. The life of an LED is, however, closely connected to its operating conditions, namely its operating temperature and the current passing through it. These operating conditions are generally so well controlled that the LEDs fitted in vehicle headlamps and signaling devices still have a life which in theory is longer than the life of the vehicle and therefore as a general rule they cannot be removed or replaced.

The same is not true of vehicle headlamps and signaling devices that use conventional incandescent bulbs that need to be easy to replace. Regulations, notably European regulations, regarding vehicle lighting and signaling have also recently ruled that the user of the vehicle has to be able to access the conventional bulbs in order to replace them.

The life of the LEDs fitted in vehicle headlamps and signaling devices can also be influenced, and more particularly shortened, as a function of various parameters essentially connected with their direct environment. Given that the use of LEDs in vehicle lighting and signaling has become the trend only recently, there is currently very little experience regarding the long-term integrity of LEDs under such operating conditions. However, it is the commonly held view that there is a risk that faults will occur over the course of time and that replacing LEDs may prove necessary.

Patent document WO 2006/066531 A1, which is equivalent to U.S. Patent Publication No. 2008/0130308, which issued as U.S. Pat. No. 7,806,562, discloses a quick-fit light source module of the LED type. In addition to having one or more light sources of the LED type, this module comprises a cooling radiator that cools the light source or sources and a quick-fastening device of the bayonet type. This teaching is attractive from a standpoint of ease of fitting, notably since the assembly comprising the light source(s) and corresponding radiator can be quickly and easily replaced. However, replacing one or more light sources in a lighting and/or signaling module, particularly a headlamp, causes a disturbance to the beam alignment. This is particularly true in the case of LED headlamps with beam cutoff. Specifically, the position of the light source has a direct impact on the cutoff. The solution proposed in that document therefore does not allow the user of the vehicle to replace the light source because subsequent scrupulous realignment would then be necessary. Such alignment does not fall within the scope of a routine vehicle service. The vehicle headlamp will therefore have to be removed.

Patent document FR 2 917 348 A1 describes a motor vehicle lighting and/or signaling device in which the light source is carried by a mount that is removable with respect to the housing of the device. More specifically, the glass of the device comprises an opening through which the light source and its mount are arranged. The light source essentially illuminates in an opposite direction to the direction of lighting and/or signaling of the device, a reflector of the parabolic type being positioned in the housing facing the light source so as to reflect the rays emitted by the source in the main direction of lighting and/or signaling of the device. Access to the light source is had from outside the device and outside the vehicle. This arrangement has the advantage of not requiring there to be an empty space into which to fit the hand of someone working on the headlamp or a tool used by such a person when replacing the light source. However, this fitting is essentially limited to light sources of the incandescent type. This is because light sources of the LED type are arranged on a printed circuit (PCB or printed circuit board) equipped with a radiator for cooling the LED or LEDs. The mounting provided for in this teaching is difficult to apply to a light source of the LED type because of the amount of space that these components occupy.

Patent document FR 2 727 190 A1 describes a motor vehicle headlamp in which the housing comprises a rear cover pivot-mounted on the housing. Opening the housing by pivoting the cover provides access to the main light source. The cover also supports an additional light source which acts as a position light. The technical solution divulged in that document is attractive from the standpoint of the ease of replacement of the light sources but is difficult to apply to light sources of the LED type.

In general, it should be noted that the architecture of light sources of the LED type is radically different from that of light sources of the incandescent type. As already mentioned, the LEDs are usually mounted directly on a board (PCB) which is provided with one or more radiators for cooling the LED or LEDs. This arrangement gives the LED and its equipment a certain bulk. Furthermore, certain headlamps or rear lights may have arrangements of LEDs that give them an individual nature or even a "signature". Replacing one or more of the LEDs of such a lighting device may entail removal of the device so that work can be carried out at a specialist workshop.

What is needed, therefore, is a solution for replacing LED that overcomes one or more of the noted disadvantages.

SUMMARY OF THE INVENTION

It is an objective of the invention to propose a solution that alleviates at least one of the above mentioned disadvantages. More specifically, one objective of the invention is to propose a solution that enables light sources, notably of the LED type, of vehicle headlamps and signaling lights to be replaced more easily.

One subject of the invention is a lighting and/or signaling module, notably for a vehicle, comprising: at least one light source able to emit rays of light; at least one reflective surface able to reflect the rays of light emitted by the light source as a lighting and/or signaling beam along an optical axis of the module; notable in that it further comprises quick-fastening means for fastening the module to a mount.

In one embodiment of the invention, the lighting and/or signaling module on its own creates the lighting and/or signaling beam, this beam having predetermined photometry.

For preference, the light source or sources are of the LED type.

For preference, the module also comprises at least one cooling radiator for cooling the light source or sources and/or electronic means of controlling and/or regulating the current passing through the light source or sources. Still for preference, the module comprises a board supporting the LED-type light source or sources.

According to one advantageous embodiment of the invention, the quick-fastening means are at least predominantly arranged at the periphery of the module.

According to another advantageous embodiment of the invention, the fastening means are positioned longitudinally along the optical axis of the module between the two longitudinal ends of the module.

For preference, the module extends longitudinally along its optical axis.

According to yet another advantageous embodiment of the invention, the fastening means are configured in such a way as to allow the module to be fitted using a movement in a direction corresponding essentially to that of the optical axis of the module.

According to yet another advantageous embodiment of the invention, the movement involved in fitting the module is a movement of tilting with respect to a transverse direction, the tilting movement preferably taking place after the translational movement.

According to yet another advantageous embodiment of the invention, the quick-fastening means are of the type involving rotation about an axis parallel to or coincident with the optical axis of the module, preferably of the bayonet type, and the quick-fastening means preferably comprise a mounting flange.

According to yet another advantageous embodiment of the invention, the quick-fastening means comprise rotation-proofing means configured to prevent the module from becoming detached, the rotation-proofing means preferably comprising a notch at the periphery of the flange.

According to yet another advantageous embodiment of the invention, the or at least one of the reflective surfaces is of elliptical profile having a first focal point occupied by the light source or at least one of the light sources and a second focal point, the quick-fastening means being positioned longitudinally along the optical axis of the module between the second focal point and the front end of the module, preferably level with the second focal point.

Alternatively, the reflective surface or at least one of the reflective surfaces may be of elliptical profile.

According to yet another advantageous embodiment of the invention, the module comprises a projection lens for projecting the lighting beam, the quick-fastening means being positioned along the optical axis of the module between the second focal point and the lens.

According to yet another advantageous embodiment of the invention, the module comprises holding means arranged at the rear end of the module, preferably on a cooling radiator for cooling the or at least one of the light sources, the means being one of the following: a rear face which, in a longitudinal cross section, has a profile with a projecting part suited to holding in the hand, a rear face that has generally parallel lateral faces suited to holding in the hand, a rear face that has at least two orifice(s) and/or notch(es) suited to accepting rods of a holding tool separate from the module.

Another subject of the invention is a mount for a lighting and/or signaling module, notably for a vehicle, characterized in that the mount comprises quick-fastening means intended to collaborate with corresponding quick-fastening means of the module according to the invention.

According to one advantageous embodiment of the invention, the mount comprises an orifice intended to accept the module and a surface for fitting of the module.

According to another advantageous embodiment of the invention, the mount comprises, at the periphery of the orifice, rotation-proofing means that prevent the module from rotating, the means being able to collaborate with a notch at the periphery of the fastening means of the module.

According to yet another advantageous embodiment of the invention, the rotation-proofing means comprise an element able to move radially with respect to the orifice and/or an element able to move in terms of rotation and configured to act like a pawl.

Another subject of the invention is a lighting and/or signaling device, notably for a vehicle, comprising a lighting and/or signaling module and a mount for the module, characterized in that the module is in accordance with the invention and/or the mount is in accordance with the invention.

The technical measures of the invention that have just been described allow the light source or sources to be replaced easily without thereby disturbing the lighting or signaling beam alignment. Specifically, the act of replacing the complete module means that the essential optical elements of the lighting and/or signaling device can be replaced. These elements are preset within the module; replacing it therefore makes it possible to avoid a potentially substantial loss in the quality of the lighting and/or signaling beam. This ease of removal of the module, notably in the event of failure of one or more of the LED light sources, means that the LEDs and their mount can be replaced with new models of LEDs which may potentially perform better. Specifically, given the way that LEDs are evolving, new models may come in to replace the old ones. The fact that the entire module can be replaced will make it possible to get around there being obsolete models of LEDs and provide replacement modules in which the LEDs use the latest and most commonplace technology. This solution will therefore allow standardization of LEDs and, as a result, a reduction in costs.

These and other objects and advantages of the invention will be apparent from the following description, the accompanying drawings and the appended claims.

BRIEF DESCRIPTION OF THE ACCOMPANYING DRAWINGS

Further features and advantages of the present invention will become better understood from the description and drawings among which:

FIG. 4 is a side view of the lighting module of FIG. 1, illustrating the siting of the bayonet-fastening means which are illustrated head-on;

FIG. 9 is a perspective view of the rear part of a lighting means according to a sixth embodiment, FIG. 9 illustrating a second example of means of holding the module; and FIG. 10 is a perspective view of the rear part of a lighting module according to a seventh embodiment, FIG. 10 illustrating a third example of means of holding the module.

DETAILED DESCRIPTION OF THE PREFERRED EMBODIMENTS

In the description that is about to follow, a series of exemplary embodiments of the invention will be described. For the convenience and clarity of the description, these various examples relate to lighting modules, that is, to headlamp modules usually situated at the front of the vehicles. However, it must be understood that the invention and, more particularly, the technical solutions of the examples which are about to follow likewise apply to signaling modules, that is, notably to modules for signaling lights which are usually situated at the rear of the vehicles.

In the description that is about to follow, reference will be made to the optical axis of the lighting modules. In this context, the use of the terms "front" and "rear" are to be understood in relation to the direction of illumination of the modules. When the module is positioned at the front of the vehicle, the expression "front" will correspond to the normal direction of travel of the vehicle, whereas when the module is positioned at the rear of the vehicle, it will be the opposite of this direction.

Although the invention is targeted essentially at applications in the field of vehicles, it can nonetheless be applied to the field of lighting in general. The lighting and signaling devices and modules can therefore be oriented in ways other than those depicted in the figures. Relative terms such as "front", "rear", etc. used in relation to the figures which illustrate a highly specific orientation of the lighting modules must not therefore be interpreted as limiting.

Figure 1:
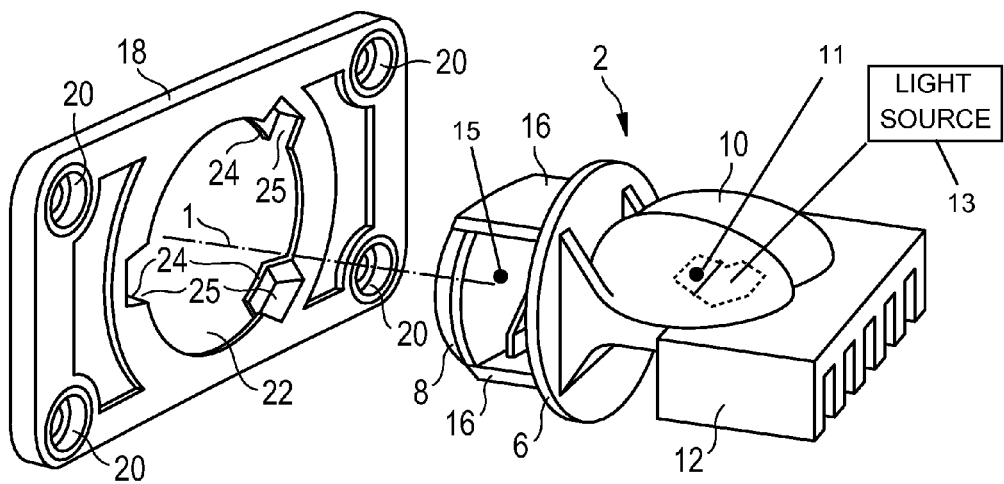
FIG. 1 is a perspective view of a lighting module and of its mount, according to a first embodiment of the invention.

FIG. 1 illustrates a lighting module 2 for a vehicle, according to a first embodiment of the invention. This is a lighting module 2 and its mount 18. The module 2 is of the type having an elliptical reflector, which means that the module 2 comprises a reflector 10, specifically a double reflector, the reflective surface of which has an elliptical profile with two focal points. A first focal point is occupied by a light source 13 of LED type (not visible) such that the rays of light emitted by the light source 13 at the first focal point 11 are reflected by the reflective surface predominantly toward the second focal point 15. A lens 8 is positioned at the front of the reflector 10 so that the first focal point 11 of the lens 8 corresponds at least approximately to the second focal point 15 of the reflective surface. These various elements are aligned along the optical axis 1 of the module 2 which may also be likened to its longitudinal axis. It should be noted that a reflective surface may be positioned in the plane delimiting the reflective surface of the reflector 10, with a front edge level with the second focal point 15 so as to obtain a lighting beam cutoff as demanded by the regulations for the lighting function known as "dipped" or alternatively "low beam". This configuration is well known per se to those skilled in the art and will not therefore be explained further.

The lighting module 2 also comprises a fastening flange 6 and fastening tabs 16 for fastening the lens to the flange 6. It also comprises a cooling radiator 12 for cooling the light sources 13.

The front part of the module 2, which means to say the part up to the flange 6, is intended to pass through the orifice 22 in the mount 18. The latter is generally planar in the specific instance of FIG. 1. It should be noted that it could adopt various shapes other than the one illustrated and also shapes that are nonplanar. The mount 18 comprises a series of holes 20 for fastening to a housing (not depicted) of the headlamp (likewise not depicted). The orifice is generally circular and has a surface for mounting of the flange 6 which is generally planar. The same is true of the flange 6. The profile of the orifice 22 of the mount 18 comprises three notches or cutouts 25 distributed about the periphery. The mount 18 may also comprise, facing each notch, a tab 24 that forms a sliding surface generally parallel to the mounting surface for mounting the flange 6 on the mount 18.

Figure 2:
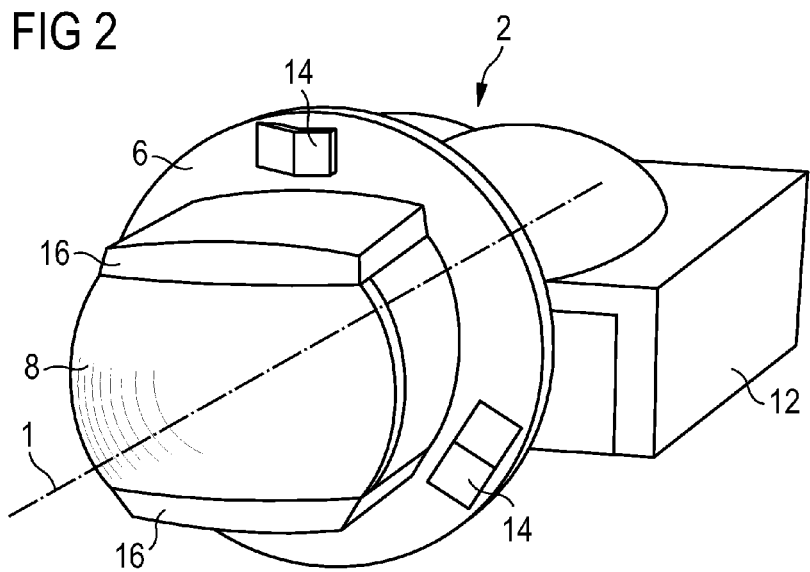
FIG. 2 is a perspective view from a different angle of the lighting module of FIG. 1.

The lighting module 2 illustrated in FIG. 2 comprises, on the front face of the mounting flange 6, three tabs 14 distributed about the periphery of the flange 6. These tabs 14 each form a surface that catches with the corresponding notch 25 of the opening 22 in the mount 18. Each of the tabs 14 is oriented essentially along the tangent to the circle formed by the flange 6. The three tabs 14 are oriented in the same direction, namely have their entire opening in one and the same either clockwise or counterclockwise direction. These three tabs 14 together with the flange 6, the notches 25 and the optional tabs 24 constitute quick-fastening means for quickly fastening the module 2 to the mount 18. Specifically, the lighting module 2 is fitted as follows: the module 2 is positioned facing the orifice 22 in the mount 18, and then undergoes a translational movement in a direction essentially corresponding to that of the optical axis 1 of the module 2 so that the front part of the module 2, namely essentially the lens 8, enters the orifice 22 to such a point that the front surface of the mounting flange 6 of the module 2 comes into contact with the corresponding surface of the mount 18. During or prior to this movement, care will be taken to position the module 2 angularly in such a way as to make the tabs 14 be in register with the respective notches 25 of the mount 18. Once the front surface of the mounting flange 6 is in contact with the corresponding surface of the mount 18 and the tabs 14 have engaged with the corresponding notches 25, the module 2 can then be turned a few degrees in the clockwise direction (in the specific case of FIGS. 1 and 2) to cause the tabs 14 to engage with the mount 18. The module 2 is thus fastened quickly to the mount 18. It can be removed notably for replacement or maintenance purposes just as easily.

It must of course be noted that the tabs 14 and the notches 25 may be distributed in a non-uniform layout on the periphery of the orifice 22 in order, in addition, to perform an error-proofing function. In such a case, the module 2 will be able to be fastened to the mount 18 properly only in one predetermined angular position. Indeed the module 2 has characteristics in terms of the beam which dictate that it be angularly positioned in a given position.

Other embodiments of the invention will now be described in conjunction with FIGS. 3 and 5 to 10. Numerous elements that make up the modules and mounts illustrated in FIGS. 3 and 5 to 10 correspond to those of FIGS. 1 and 2. A consistent numbering system has been adopted for denoting these various elements considering that the reference signs of FIG. 3 correspond to those of FIGS. 1 and 2 except that they are increased by 100. The same is true in respect of FIG. 5 where they are increased by 200, in respect of FIG. 6 where they are increased by 300, in respect of FIG. 7 where they are increased by 400, in respect of FIG. 8 where they are increased by 500, in respect of FIG. 9 where they are increased by 600, and in respect of FIG. 10 where they are increased by 700. In the case of the elements in these figures that have no corresponding counterpart in FIGS. 1 and 2, specific reference signs have been used.

Figure 3:
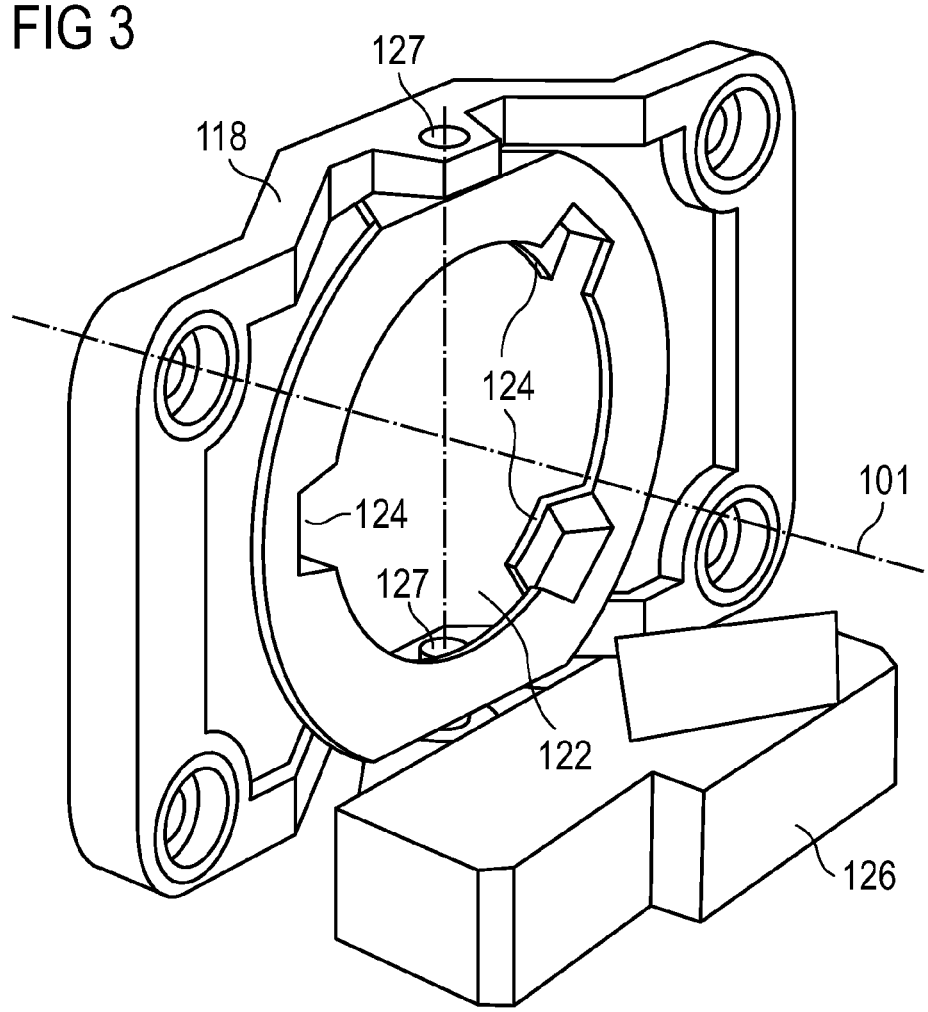
FIG. 3 is a perspective view of an alternative form of the lighting module mount of FIG. 1.

FIG. 3 illustrates an alternative form of the mount 18 of FIG. 1. Specifically, the mount 118 of FIG. 3 is, in theory, equivalent to that of FIG. 1 except that it is able to rotate about a vertical axis so as to perform a dynamic bending light (DBL) function. The construction of the mount 118 differs from that of FIG. 1 essentially in that it comprises an upper bearing and a lower bearing 127 which are intended to collaborate with pivots of the headlamp housing. Only the lower pivot has been depicted. It comprises a motorized device 126 intended for pivoting the mount 118 about the generally vertical axis formed by the bearings and pivots that have just been described. In the light of FIG. 3, the freedom of the mount 118 to pivot and the presence of a drive device does not prevent the lighting module from being fitted on the mount as described in conjunction with FIGS. 1 and 2.

Figure 4:
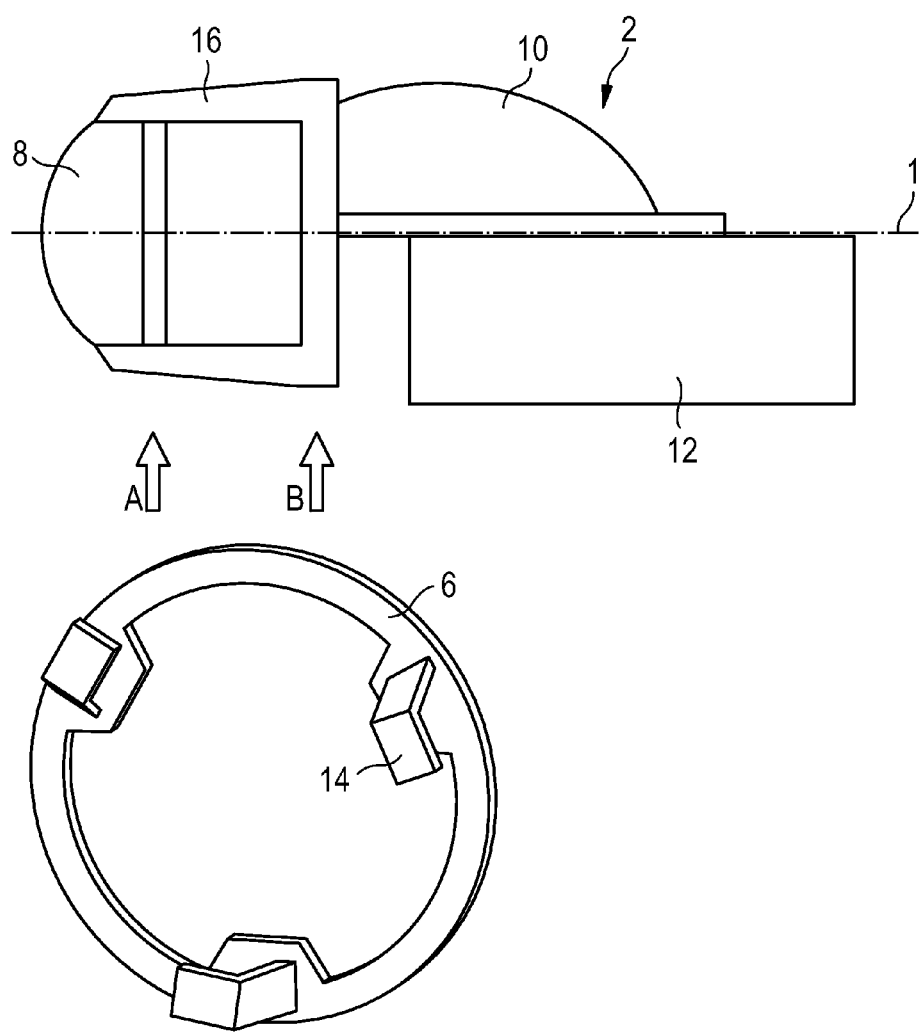

FIG. 4 illustrates the preferred positionings for the quick-fastening means. More particularly, the figure comprises a view of a fastening flange 6 corresponding to that of FIGS. 1 and 2 and a side view of the lighting module 2 with two arrows A and B. These two arrows A, B are reference marks defining the preferred positioning field for the fastening means. Position A corresponds essentially to the rear face of the lens 8 and position B corresponds essentially to the second focal point (not visible) of the reflective surfaces 10. Positioning the fastening means at B is advantageous insofar as this is the position in which the effect of vibration will have the least influence on the emitted beam. Position A is also advantageous insofar as it allows the module 2 to be fastened using the lens 8 fastening tabs 16. It is also advantageous because it makes it possible for only the lens 8 to be visible from outside the headlamp. It must be understood that the fastening means and, more particularly, the flange 6 illustrated in FIG. 4 can be arranged at any longitudinal position contained between the reference marks A and B.

Figure 5:
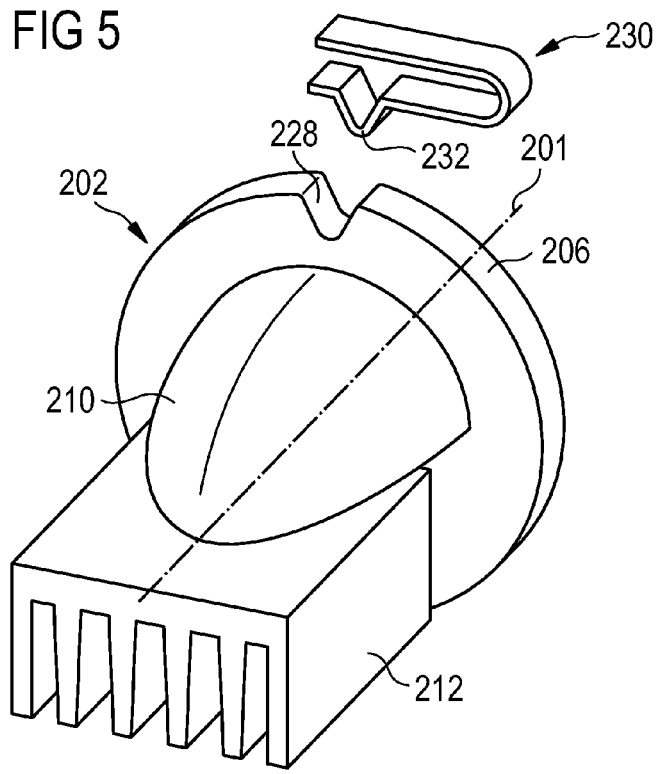
FIG. 5 is a perspective view of a lighting module according to a second embodiment, FIG. 5 illustrating a first example of means of rotation proofing the module.

FIG. 5 is a perspective view of the rear part of a lighting module 202 according to a second embodiment of the invention. The fastening flange 206, similar to that of FIGS. 1, 2 and 4, comprises a notch 228 at its periphery. The mount (not depicted) comprises a rotation-proofing means 230 in the form of a point 232 able to collaborate with the notch 228 and mounted on a spring. In the particular example of FIG. 5, the spring function is performed by a strip in the overall shape of a U, the point 232 being carried by one end of the strip. The point 232 is able to collaborate with the corresponding notch 228 when the fastening flange 206 has reached its final angular position. The resistance to rotation in the opposite direction which is thus applied on the one hand allows the fitter or the user of the vehicle busy replacing the module 202 to feel that the fastening means are fully engaged and on the other hand prevents any unwanted detachment. It should be noted that rotation-proofing means or at least means able to apply resistance to the reverse rotation of the module 202 could equally well be provided at the tabs (not visible, corresponding to the tabs 14 of FIG. 2) of the flange 206.

Figure 6:
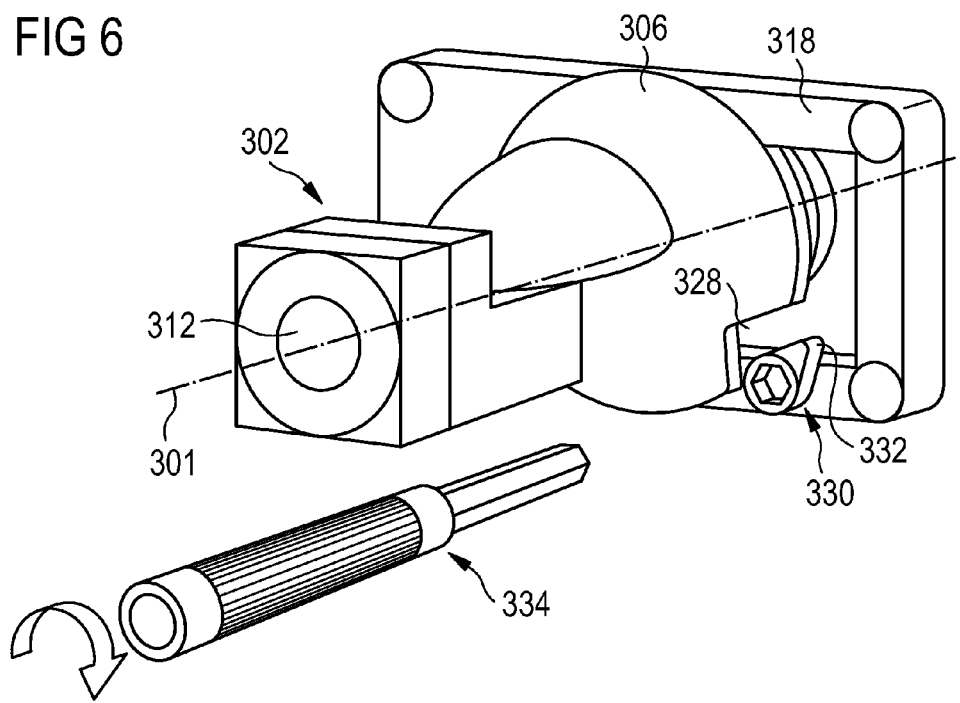
FIG. 6 is a perspective view of a lighting module according to a third embodiment, FIG. 6 illustrating a second example of means of rotation proofing the module.

FIG. 6 illustrates an alternative to the rotation-proofing means of FIG. 5, this alternative corresponding to a third exemplary embodiment of the invention. In a similar way to the module of FIG. 5, the fastening flange 306 of the module 302 of FIG. 6 also comprises a notch 328 at its periphery. In a similar way to the example of FIG. 5, the mount 318 also comprises a point 332 intended to collaborate with the notch 328. The rotation-proofing means or cam 330 comprising the point 332 is, however, here able to rotate relative to the mount 318. Its axis of rotation is generally parallel to the optical or longitudinal axis of the module 302. The rotation-proofing means 330 in fact takes the form of a cam mounted such that it can rotate on the mount 318. It comprises a screw head relief generally centered on the axis of rotation of the cam 330. The relief is intended to allow the cam 330 to be turned using a tool 334 of the screwdriver type. The cam 330 can be mounted free to turn on its axis, preferably with a resistive torque intended to hold it in position. It may also be mounted with elastic means of the spring type that provide a return force returning it to a position, notably a position of engagement with the notch 328. In this case, aside from rotating in the direction of disengaging the cam 330 from the notch 328, a torque will need to be applied and maintained via the tool 334 during the rotation for removing the module 302.

Figure 7:
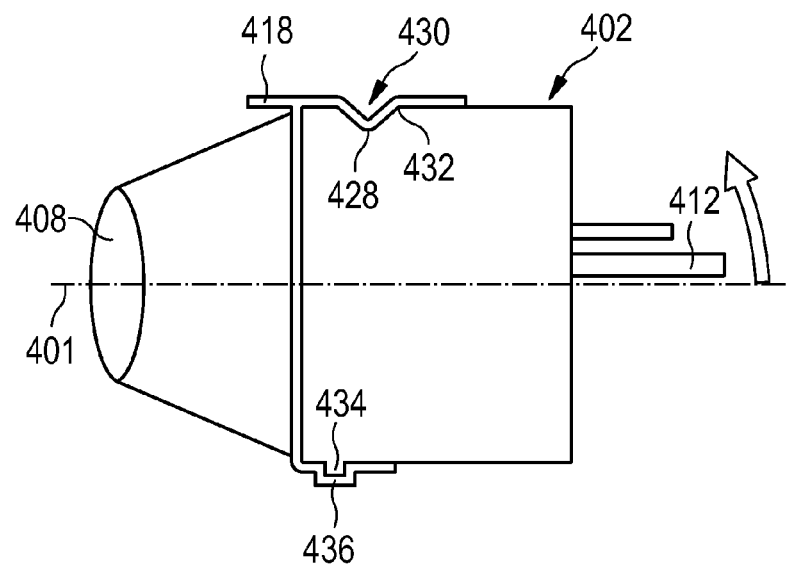
FIG. 7 is a side view of a lighting module and of its mount according to a fourth embodiment of the invention.

FIG. 7 illustrates a fourth exemplary embodiment of the invention. The quick fastening of the module 402 to the mount 418 here is no longer performed using a rotational movement but rather by using a tilting movement. Specifically, the lighting module 402 no longer has a flange but rather has a front surface intended to come into contact with a corresponding surface of the mount 418 and an exterior surface at its periphery. The exterior surface of the module 402 comprises at least one peg 434 preferably positioned at a lower part. The peg 434 is generally directed radially downward. The mount 418 comprises a support 436 with a recess corresponding to the peg 434 so that it can accommodate it and provide positive contact connection in a direction generally parallel to the optical axis of the module 402 directed toward the rear of the module 402 and also a direction perpendicular to the optical axis 401 and directed downward. The module 402 at its periphery comprises a notch 428 intended to collaborate with a point 432 of a fastening means 430 of the mount 418. This fastening means comprises elastic means supporting the point 432 in such a way as to allow the point 432 to move when the module 402 is being fitted onto the mount 418. The fitting movement involves offering up the module 402 in a translational movement with the module 402 in an inclined position at the moment it makes contact with the mount 418. The peg or pegs 434 are brought into register with the support 436 and the module 402 is then tilted from its inclined position into a generally horizontal position so that its front surface comes into contact with the corresponding rear surface of the mount 418 and so that the point 432 engages with the notch 428 of the module 402. This tilting movement is illustrated by the arrow in FIG. 7.

FIGS. 1 to 7 illustrate various embodiments of the quick-fastening means. It must be understood that these means may adopt other forms which have not been described.

Figure 8:
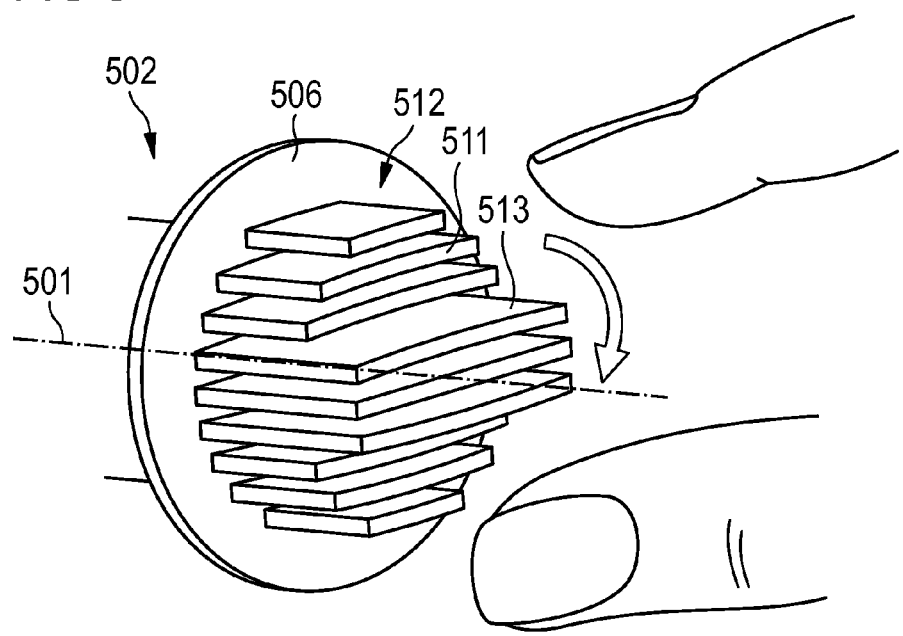
FIG. 8 is a perspective view of the rear part of a lighting module according to a fifth embodiment, FIG. 8 illustrating a first example of means of holding the module.

FIG. 8 is a perspective view of the rear part of a lighting module 502 according to a fifth embodiment of the invention. This embodiment is no longer directly concerned with the quick-fastening means, which may notably adopt the various forms described hereinabove, but rather with how the module 502 is held so that it can be fitted and removed. The lighting module 502 comprises a radiator 512 at its rear part, the radiator 512 being intended to remove heat energy from the LED light sources and provide a satisfactory grasp on the module 502 notably so that it can be fastened to a mount using the quick-fastening means. The radiator 512 in the conventional way comprises a series of fins. However, these fins are directed backward and, in addition, a first group of adjacent fins 513 has a first given height, and a second group of adjacent fins arranged on either side of the first group has a second height smaller than the first height so as to allow the first group to be held in the hand. The latter group is preferably generally centered with respect to the axis of rotation of the module 502 so that it can be fitted, in instances in which the quick-fastening means are of the rotation type. The difference in height between the two groups of fins is greater than 10 mm, preferably 15 mm, more preferably still 20 mm, for ease of handling.

FIG. 9 is a perspective view of the rear part of a lighting module 602 according to a sixth embodiment of the invention. This is another embodiment of the means of holding the module 602 so that it can be fitted and removed. Just as in the previous example, namely that of FIG. 8, the holding means are situated level with the radiator 612 which is arranged at the rear of the module 602. The radiator 612 comprises two lateral external faces 611. These faces 611 are preferably generally planar and parallel. In addition, they may be provided with ribs 613 oriented parallel to the optical or longitudinal axis of the module 602. In addition, these two faces 611 are taller than the fins of the radiator 612 which are arranged between these two faces 611. This contrivance makes it possible to avoid any contact with the fins which may otherwise be even hotter and/or sharper than the lateral faces 611.

FIG. 10 is a perspective view of the rear part of a lighting module 702 according to a seventh embodiment of the invention. This is another embodiment of the means of holding the module 702 so that it can be fitted and removed. In this case, the holding means comprise a tool intended to be engaged with the rear part of the module 702. More specifically, the module 702 at its rear part comprises a radiator 712 which comprises at least two orifices 711 distant from one another and oriented along the optical or longitudinal axis 701 of the module 702. The tool 721 essentially comprises a holding part 719 which is ergonomically designed for holding in the hand and handling, and a part for connecting with the module 702. This connecting part comprises at least two rods 713 running parallel to one another from the tool 721. These are intended to collaborate with the orifices 711 by entering them. The tool 721 can thus be made to rotate as one with the module 702. The connecting part of the tool 721 may also comprise an additional element, for example a rib 717, intended to collaborate with the gap present between two fins of the cooling device 712. Of course, the holding part and connecting part of the tool may adopt various shapes other than those illustrated in FIG. 10.

In general, the various embodiments which have just been described in conjunction with the figures are schematic and nonlimiting examples of the invention. In practice, variations may be made particularly in respect of certain embodiment details.

From a materials standpoint, the quick-fastening means will preferably be made of injection-molded plastic. They may, however, contain other materials such as metallic materials, notably in insert form. The tools for fitting and removing the module may also contain plastics or even a combination of metallic and plastics materials.

In general, the housing of the lighting and/or signaling device may comprise a hatch providing access to the module. This hatch will preferably be positioned at the rear of the housing, facing the module, so as to allow the latter to be extracted using a translational movement. However, other locations are possible, notably according to the accessibility and volume of the housing. The hatch may be formed by the outline of a line of weakness or a precut. The housing may be opened by detaching the wall portion formed by this outline. This wall portion may then be put back in place notably by sticking. Other embodiments of the hatch may of course be envisioned.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting module comprising:
at least one light source able to emit rays of light, said at least one light source being a light-emitting diode;
at least one reflective surface able to reflect said rays of light emitted by said at least one light source as a light beam along an optical axis of said lighting module;
wherein said lighting module further comprises quick-fastening means for fastening said lighting module to a mount;
wherein said lighting module further comprises holding means or a holder arranged at a rear end of said lighting module on a cooling radiator for cooling said at least one light source, said holding means or holder being a rear face which, in a longitudinal cross section, has a profile with a projecting part suited to holding in the hand;
said lighting module generating a lighting or signaling light for in a motor vehicle; and
wherein said at least one reflective surface comprises an elliptical profile having a first focal point occupied by said at least one light source and a second focal point such that said rays of light emitted by said at least one light source at said first focal point are reflected by said at least one reflective surface toward said second focal point, said quick-fastening means being positioned longitudinally about said optical axis of said lighting module substantially between said second focal point and a front end of said lighting module generally level with said second focal point.

2. The lighting module according to claim 1, wherein said quick-fastening means are configured in such a way as to allow said lighting module to be fitted using a movement in a direction corresponding essentially to that of said optical axis of said lighting module.

3. The lighting module according to claim 1, wherein said quick-fastening means are of the type involving rotation about an axis parallel to or coincident with said optical axis of said lighting module and said quick-fastening means preferably comprise a mounting flange, said quick-fastening means comprising a bayonet connection.

4. The lighting module according to claim 1, wherein said lighting module comprises a projection lens for projecting said lighting beam, said quick-fastening means being positioned longitudinally along said optical axis of said lighting module between said second focal point and said projection lens.

5. A mount for a lighting module for a vehicle, wherein said mount comprises quick-fastening means intended to collaborate with corresponding quick-fastening means of said lighting module according to claim 1.

6. The mount according to claim 5, wherein said mount comprises an orifice intended to accept said lighting module and a surface for fitting of said lighting module.

7. A lighting device for a vehicle, comprising a lighting module and a mount for said lighting module, wherein said lighting module is in accordance with claim 1 and a mount for a lighting module, wherein said mount comprises quick-fastening means intended to collaborate with corresponding quick-fastening means of said lighting module.

8. A lighting module comprising:
at least one light source able to emit rays of light, said at least one light source being at least one light-emitting diode;
at least one reflective surface able to reflect said rays of light emitted by said at least one light source as a light beam along an optical axis of said lighting module;
wherein said lighting module further comprises a quick-fastener for fastening said lighting module to a mount; and
wherein said lighting module further comprises holding means or a holder arranged at a rear end of said lighting module on a cooling radiator for cooling said at least one light source, said holding means or holder being a longitudinal cross section, has a profile with a projecting part suited to holding in the hand;
said lighting module generating a lighting or signaling light for in a motor vehicle; and
wherein said at least one reflective surface comprises an elliptical profile having a first focal point occupied by said at least one light source and a second focal point such that said rays of light emitted by said at least one light source at first focal point are reflected by said at least one reflective surface toward said second focal point, said quick-fastener for fastening said lighting module being positioned longitudinally about said optical axis of said lighting module substantially between said second focal point and a front end of said lighting module, generally level with said second focal point.

9. The lighting module according to claim 8, wherein said quick-fastener is positioned along said optical axis of said lighting module between the two longitudinal ends of said lighting module.

10. The lighting module according to claim 8, wherein said quick-fastener is configured in such a way as to allow said lighting module to be fitted using a movement in a direction corresponding essentially to that of said optical axis of said lighting module.

11. The lighting module according to claim 10, wherein said movement involved in fitting said lighting module is a movement of tilting with respect to a transverse direction, said movement of tilting preferably taking place after a translational movement.

12. The lighting module according to claim 1, wherein said quick-fastening means are of the type involving rotation about an axis parallel to or coincident with said optical axis of said lighting module, preferably of a bayonet type, and said quick-fastening means preferably comprise a mounting flange.

13. The lighting module according to claim 2, wherein said quick-fastening means are of the type involving rotation about an axis parallel to or coincident with said optical axis of said lighting module, preferably of a bayonet type, and said quick-fastening means preferably comprise a mounting flange.

14. The lighting module according to claim 1, wherein said light beam is a signaling beam.

15. The lighting module according to claim 8, wherein said light beam is at least one of a headlight beam or a signaling beam.

16. A lighting module comprising:
at least one light source able to emit rays of light, said at least one light source being a light-emitting diode;
at least one reflective surface able to reflect said rays of light emitted by said at least one light source as a light beam along an optical axis of said lighting module;
wherein said lighting module further comprises quick-fastening means for fastening said lighting module to a mount;
wherein said lighting module further comprises holding means or a holder arranged at a rear end of said lighting module on a cooling radiator for cooling said at least one light source, said holding means or holder being a rear face that has generally parallel lateral faces suited to holding in the hand;
said lighting module generating a lighting or signaling light for in a motor vehicle; and
wherein said at least one reflective surface comprises an elliptical profile having a first focal point occupied by said at least one light source and a second focal point such that said rays of light emitted by said at least one light source at said first focal point are reflected by said at least one reflective surface toward said second focal point, said quick-fastening means being positioned longitudinally about said optical axis of said lighting module substantially between said second focal point and a front end of said lighting module, generally level with said second focal point.

17. A lighting module comprising:
at least one light source able to emit rays of light, said at least one light source being a light-emitting diode;
at least one reflective surface able to reflect said rays of light emitted by said at least one light source as a light beam along an optical axis of said lighting module;
wherein said lighting module further comprises quick-fastening means for fastening said lighting module to a mount;
wherein said lighting module further comprises holding means or a holder arranged at a rear end of said lighting module on a cooling radiator for cooling said at least one light source, said holding means or holder being a rear face that has at least two orifice(s) or notch(es) suited to accepting rods of a holding tool separate from said lighting module;
said lighting module generating a lighting or signaling light for in a motor vehicle; and
wherein said at least one reflective surface comprises an elliptical profile having a first focal point occupied by said at least one light source and a second focal point such that said rays of light emitted by said at least one light source at said first focal point are reflected by said at least one reflective surface toward said second focal point, said quick-fastening means being positioned longitudinally about said optical axis of said lighting module substantially between said second focal point and a front end of said lighting module, generally level with said second focal point.

18. A lighting module comprising:
at least one light source able to emit rays of light, said at least one light source being at least one light-emitting diode;
at least one reflective surface able to reflect said rays of light emitted by said at least one light source as a light beam along an optical axis of said lighting module;
wherein said lighting module further comprises a quick-fastener for fastening said lighting module to a mount; and
wherein said lighting module further comprises holding means or a holder arranged at a rear end of said lighting module on a cooling radiator for cooling said at least one light source, said holding means or holder being a rear face that has generally parallel lateral faces suited to holding in the hand;

said lighting module generating a lighting or signaling light for in a motor vehicle; and wherein said at least one reflective surface comprises an elliptical profile having a first focal point occupied by said at least one light source and a second focal point such that said rays of light emitted by said at least one light source at said first focal point are reflected by said at least one reflective surface toward said second focal point, said quick-fastener for fastening said lighting module being positioned longitudinally about said optical axis of said lighting module substantially between said second focal point and a front end of said lighting module, generally level with said second focal point.

19. A lighting module comprising:

at least one light source able to emit rays of light, said at least one light source being at least one light-emitting diode;

at least one reflective surface able to reflect said rays of light emitted by said at least one light source as a light beam along an optical axis of said lighting module;

wherein said lighting module further comprises a quick-fastener for fastening said lighting module to a mount; and wherein said lighting module further comprises holding means or a holder arranged at a rear end of said lighting module on a cooling radiator for cooling said at least one light source, said holding means or holder being a rear face that has at least two orifice(s) or notch(es) suited to accepting rods of a holding tool separate from said lighting module;

said lighting module generating a lighting or signaling light for in a motor vehicle; and wherein said at least one reflective surface comprises an elliptical profile having a first focal point occupied by said at least one light source and a second focal point such that said rays of light emitted by said at least one light source at said first focal point are reflected by said at least one reflective surface toward said second focal point, said quick-fastener for fastening said lighting module being positioned longitudinally about said optical axis of said lighting module substantially between said second focal point and a front end of said lighting module, generally level with said second focal point.

* * * * *

UNITED STATES PATENT AND TRADEMARK OFFICE
CERTIFICATE OF CORRECTION

PATENT NO. : 9,200,787 B2
APPLICATION NO. : 13/626067
DATED : December 1, 2015
INVENTOR(S) : Le Bars et al.

Page 1 of 1

It is certified that error appears in the above-identified patent and that said Letters Patent is hereby corrected as shown below:

Claims:

Claim 8, Column 11, line 27, insert --said-- before "first focal point".

Signed and Sealed this
Fifth Day of July, 2016

Michelle K. Lee
*Director of the United States Patent and Trademark Office*